(12) United States Patent
Li et al.

(10) Patent No.: US 9,049,145 B2
(45) Date of Patent: Jun. 2, 2015

(54) METHOD AND APPARATUS FOR CALCULATING MPLS TRAFFIC ENGINEERING PATHS

(75) Inventors: Renwei Li, Fremont, CA (US); Bin Xiao, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 407 days.

(21) Appl. No.: 12/141,208

(22) Filed: Jun. 18, 2008

(65) Prior Publication Data

US 2009/0316583 A1    Dec. 24, 2009

(51) Int. Cl.
*H04L 12/723*    (2013.01)
*H04L 12/721*    (2013.01)

(52) U.S. Cl.
CPC .............. *H04L 45/50* (2013.01); *H04L 45/12* (2013.01)

(58) Field of Classification Search
CPC ............................... H04L 45/12; H04L 45/50
USPC ........................................................ 370/236
See application file for complete search history.

(56) References Cited

U.S. PATENT DOCUMENTS

| | | | | |
|---|---|---|---|---|
| 5,598,532 | A * | 1/1997 | Liron ................................. | 703/2 |
| 2002/0045453 | A1 * | 4/2002 | Juttner et al. .................. | 455/445 |
| 2002/0150041 | A1 | 10/2002 | Reinshmidt et al. | |
| 2003/0118027 | A1 * | 6/2003 | Lee et al. .................. | 370/395.21 |
| 2004/0073702 | A1 | 4/2004 | Rong et al. | |
| 2005/0259664 | A1 * | 11/2005 | Vasseur et al. ........... | 370/395.52 |
| 2006/0268681 | A1 * | 11/2006 | Raza .............................. | 370/216 |
| 2007/0019558 | A1 | 1/2007 | Vasseur et al. | |
| 2007/0159984 | A1 * | 7/2007 | Hentschke et al. ........... | 370/254 |

FOREIGN PATENT DOCUMENTS

| | | |
|---|---|---|
| CN | 1350224 A | 5/2002 |
| CN | 101159695 A | 4/2008 |

OTHER PUBLICATIONS

Dijkstra, E. W., "A Note on Two Problems in Connexion With Graphs," Numerische Mathematik 1, pp. 269-271, 1959.

Goto, Takayuki et al., "On the Heuristics of A* or A Algorithm in ITS and Robot Path-Planning," Proceedings of the 2003 IEEE/RSJ International Conference on Intelligent Robots and Systems, pp. 1159-1166, Oct. 2003.

Hart, Peter E. et al., "A Formal Basis for the Heuristic Determination of Minimum Cost Paths," IEEE Transactions of Systems Science and Cybernetics, vol. SSC-4, No. 2, pp. 100-107, Jul. 1968.

(Continued)

*Primary Examiner* — Jason Mattis
*Assistant Examiner* — Stephen J Clawson
(74) *Attorney, Agent, or Firm* — Slater & Matsil, L.L.P.

(57) ABSTRACT

Methods and apparatuses are provided for searching a least-cost path between a source node and a destination node in a communication network. A set of costs associated with least-cost paths from the source node to a set of intermediate nodes is first determined. A least-cost path in a reverse direction from the destination node to an intermediate node is also determined. The intermediate node is selected based at least on a first cost associated with the least-cost path from the destination node to the intermediate node, and a second cost associated with a least-cost path from the source node to the intermediate node that was first determined. Accordingly, the least-cost path between the source node and the destination node might then be calculated by using the second cost as heuristic information.

31 Claims, 3 Drawing Sheets

(56) References Cited

OTHER PUBLICATIONS

Xiao, Wendong et al., "Evaluation of Heuristic Path Selection Algorithms for Multi-Constrained QoS Routing," Proceedings of the 2004 IEEE International Conference on Networking, Sensing & Control, pp. 112-116, Mar. 21-23, 2004.
International Search Report received in International Applicaton No. PCT/CN2009/072059, Huawei Technologies Co., Ltd., mailed Sep. 10, 2009, 2 pages.
First Chinese Office Action and Partial English Translation in Chinese Application No. 200980118818.0 mailed Jun. 27, 2012, 24 pages.
Written Opinion of the International Searching Authority, PCT/CN2009/072059, Huawei Technologies Co., Ltd., Sep. 10, 2009, 3 pages.

* cited by examiner

METHOD AND APPARATUS FOR CALCULATING MPLS TRAFFIC ENGINEERING PATHS

BACKGROUND

This application relates generally to searching a least-cost path in a communication network. More specifically, this application relates to methods and apparatuses for calculating Multi-Protocol Label Switching ("MPLS") traffic engineering ("TE") paths.

MPLS networks are becoming widespread. The exponential growth of the Internet and communication networks in general has not only resulted in a similar growth in the quantity of network traffic, but also in greater needs for better quality of service ("QoS"). Meanwhile, emerging applications such as voice, video, and business-critical functions will only result in even greater needs for more bandwidth and higher quality of service. One solution that is becoming widespread to better meet these needs is MPLS technology.

Besides being better suited for IP-based networks than certain existing technologies, one key advantage provided by MPLS is improved manageability. Namely, MPLS provides traffic engineering for minimizing network congestion, meeting quality of service requirements, and providing network reliability and availability. One component of traffic engineering is configuring and/or calculating MPLS traffic engineering paths.

A MPLS network includes a network of label switch routers ("LSR"). End-to-end paths through the network of LSRs can be configured and/or calculated for a variety of purposes, such as to meet bandwidth and/or quality of service requirements. These end-to-end paths are labeled switch paths ("LSP") that are also referred to as MPLS traffic engineering LSPs or MPLS traffic engineering paths.

To better meet needs such as for more bandwidth and higher quality of service, there is a general need for improving MPLS technology and accordingly a need for new and improved methods and apparatuses for calculating MPLS traffic engineering paths.

BRIEF SUMMARY

Embodiments of the invention provide new and improved methods and apparatuses for calculating MPLS traffic engineering paths. In one set of embodiments, a set of least-cost paths from a source node to a set of nodes in a communication network is first searched. A modified Dijkstra's algorithm might be used in searching the set of least-cost paths. After obtaining good knowledge about the communication network as a result of searching the set of least-cost paths, the knowledge can be used as heuristic information in searching for other paths between the source node and other nodes in the communication network. This new and improved artificial intelligence heuristic search framework might use an algorithm including one based on A* to take advantage of the heuristic information in searching for the other paths in some embodiments.

Accordingly, configuration and/or calculation of MPLS traffic engineering paths can be made more efficient with the use of the heuristic information. MPLS technology is thus improved to better meet needs such as for more bandwidth and higher quality of service. Additionally, using the heuristic information advantageously provides greater efficiency gains as the communication network grows larger and/or as more paths to more nodes are calculated. As more paths are calculated, more knowledge about the communication network is accumulated. This ability to accumulate and use the accumulated heuristic information is expected to be particularly beneficial to large service provider's MPLS networks and/or as MPLS networks grows larger in general.

In one embodiment, a method for searching a least-cost path between a source node and a destination node in a communication network might include determining a set of costs. Each cost in the set of costs is associated with a respective one of a plurality of least-cost paths from the source node to a plurality of nodes in the communication network. The plurality of nodes might include an intermediate node, and the intermediate node might be associated with an intermediate least-cost path in the plurality of least-cost paths. The method might also include determining a least-cost path from the destination node to the intermediate node. The method might further include selecting the intermediate node based at least on a first cost associated with the least-cost path from the destination node to the intermediate node and a second cost associated with the intermediate least-cost path from the source node to the intermediate node. The intermediate node might be in the least-cost path between the source node and the destination node. Additionally, the method might include transmitting communication data along the least-cost path between the source node and the destination node.

The methods of the invention may be embodied in an apparatus comprising a communication interface, a storage medium, a controller, and a set of instructions executable by the controller for operating the apparatus in accordance with the embodiments described above. The methods of the invention may also be embodied in a computer-readable storage medium having a computer-readable program embodied therein for directing operations of an apparatus including a controller. The computer-readable program includes instructions for operating the apparatus in accordance with the embodiments described above.

BRIEF DESCRIPTION OF THE DRAWINGS

A further understanding of the nature and advantages of particular embodiments may be realized by reference to the following drawings. In the drawings, like reference labels are used throughout the several drawings to refer to similar components. In some instances, a sublabel is associated with a reference numeral followed by a hyphen to denote one of multiple similar components. When reference is made to a reference numeral without specification to an existing sublabel, it is intended to refer to all such multiple similar components.

DETAILED DESCRIPTION

Embodiments of the invention provide new and improved methods and apparatuses for calculating Multi-Protocol Label Switching ("MPLS") traffic engineering ("TE") paths. As used herein, the term "node" is intended to be construed broadly as encompassing a point in a path of communication.

In some instances, a node may be a termination or intersection node that connects at least one or two segments of a path. The path of communication might be through any type of communication network. The term "communication network" is intended to be construed broadly as encompassing any network that carries communication data, be it electrical or photonic.

Merely by way of example, in one embodiment, the communication network might be a MPLS network. In the MPLS network, a source node might be an ingress edge label switch router ("LSR") or a source LSR that receives an incoming packet and labels the packet. The packet is forwarded to a next LSR (sometimes called a core LSR) in the MPLS network along a label switch path ("LSP") in accordance with the label. When the packet reaches an egress edge LSR, the egress edge LSR removes the label and delivers the packet as the packet exits the MPLS network. The egress edge LSR might be a destination node or a destination LSR.

Accordingly, calculating the LSP through the MPLS network involves searching a path through the network of LSRs. Optimally, the path is one that is associated with a least-cost among all possible paths. A cost might be associated with certain metrics. Meanwhile, a possible path might also be subject to certain constraints including bandwidth requirements, quality of service requirements, and/or certain affinities. An "affinity" generally refers to an administrative constraint for avoiding or including certain paths. It is noted that a least-cost (or "shortest") path that satisfies a set of constraints is called a Constrained Shortest Path First ("CSPF") path.

A modified Dijkstra's algorithm might be used to first search for a set of least-cost paths from a source LSR to a set of destination LSRs. The modification to the algorithm provides that paths that violate any constraint are eliminated. At least a set of costs, with each cost being associated with a respective path in the set of least-cost paths, is stored because it can beneficially provide knowledge about the MPLS network in some embodiments. Subsequently, a path between the source LSR and another destination LSR might be searched by using an algorithm including one based on A* that can take advantage of the stored knowledge by using information from the set of costs as heuristic information in some embodiments. The use of heuristic information can greatly improve search efficiency especially as more knowledge is gained about the MPLS network.

Figure 1:
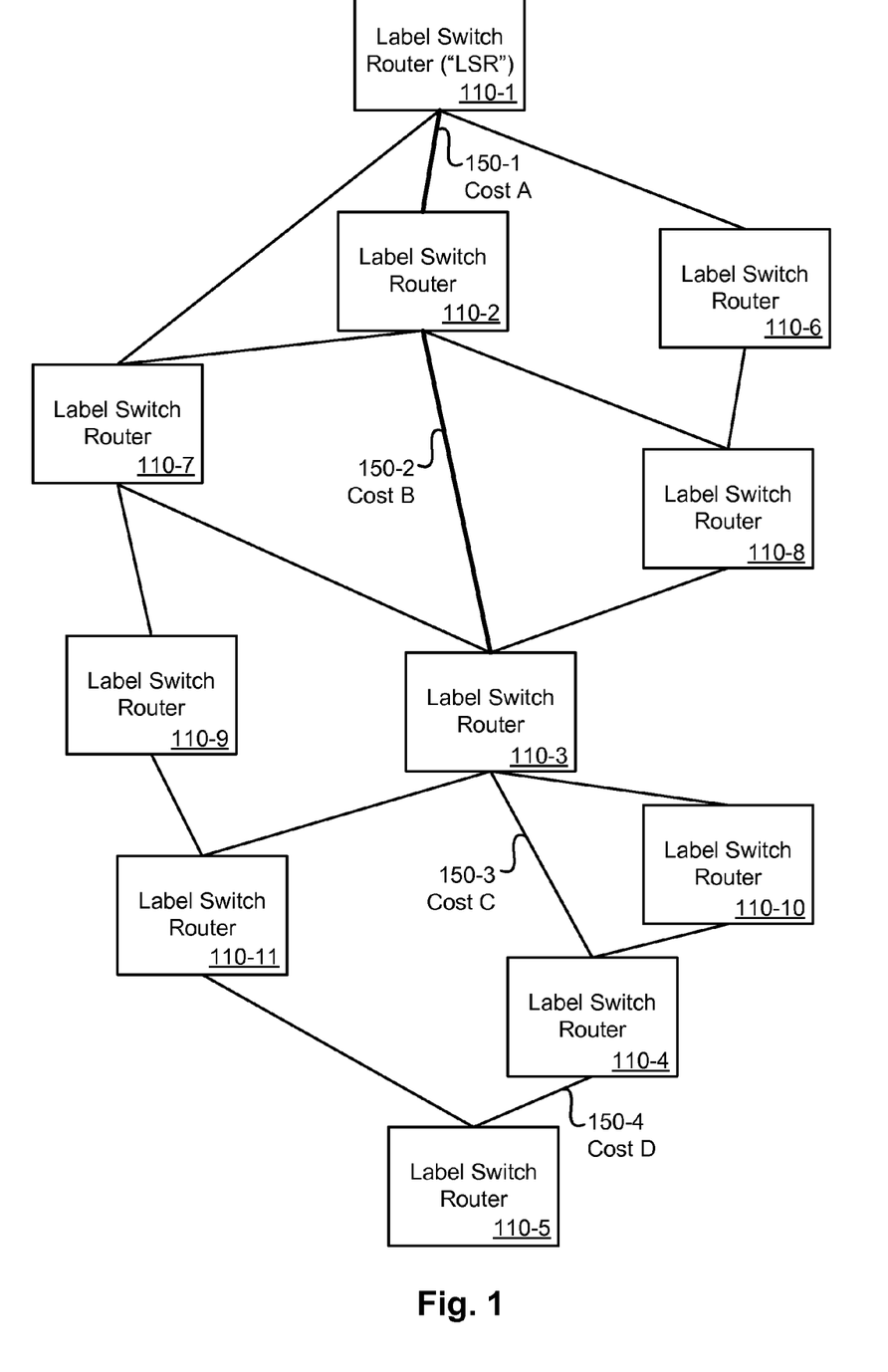
FIG. 1 provides a schematic diagram illustrating a MPLS network and searching a least-cost path between a source node and a destination node in an embodiment of the invention.

FIG. 1 provides a schematic diagram illustrating a MPLS network and searching a least-cost path between a source node and a destination node in an embodiment of the invention. The MPLS network includes a network of LSRs 110. A first LSR 110-1 is "adjacent" to a second LSR 110-2, meaning that there is no intervening LSR in between. It is noted that a path might include one or more "links," and a path between two adjacent LSRs might include one "link." A first directional metric might be associated with a first link from the first LSR 110-1 to the second LSR 110-2. Likewise, a second directional metric might be associated with a second link from the second LSR 110-2 to the first LSR 110-1. The two directional metrics might be the same or different. In some embodiments, the first directional metric might be used as a cost associated with the first link, and the second directional metric might be used as a cost associated with the second link. In other embodiments, the first directional metric might be used as a cost associated with both the first link and the second link. A link might be associated with an infinite cost if the link is unavailable (i.e., unreachable in a particular direction).

As shown, both links in either direction between the first LSR 110-1 and the second LSR 110-2 are associated with a same cost A 150-1. Similarly, a link (or both links in either direction) between the second LSR 110-2 and a third LSR 110-3 is associated with a cost B 150-2; a link between the third LSR 110-3 and a fourth LSR 110-4 is associated with a cost C 150-3; and a link between the fourth LSR 110-4 and a fifth LSR 110-5 is associated with a cost D 150-4. Other links are also shown, for example, between the first LSR 110-1 and a sixth LSR 110-6, and between the first LSR 110-1 and a seventh LSR 110-7. Indeed, the first LSR 110-1 has the following LSRs adjacent to it: the second LSR 110-2, the sixth LSR 110-6, and the seventh LSR 110-7.

To search for a least-cost path from the first LSR 110-1 to the third LSR 110-3, with the first LSR 110-1 being a source LSR and the third LSR 110-3 being a destination LSR, a modified Dijkstra's algorithm might be used. It is noted that although the modified Dijkstra's algorithm is being presented, details of Dijkstra's algorithm is expected to be well understood by those skilled in art. Prior to running the algorithm, the following data structures are initialized to be empty: OPEN_SET and CLOSED_SET. Additionally, a cost function g(X), which is a cost associated with a least-cost path among paths that have been found from the source LSR to a destination LSR X thus far, is initialized to infinity (or a very large number) for all LSRs. The cost function g( ) is set to zero for the source LSR.

It is noted that the CLOSED_SET will include a first set of LSRs such that for each LSR in the first set of LSRs, a least-cost path among all possible paths from the source LSR to the each LSR has been found. Conversely, the OPEN_SET will include a second set of LSRs such that for each LSR in the second set of LSRs, a path from the source LSR to the each LSR has been found; while the path is a least-cost path among paths that have been found thus far, the path might not be a least-cost path among all possible paths yet.

At step 1, add the source LSR 110-1 to the CLOSED_SET.

At step 2, let R, which is the LSR whose paths to all its adjacent LSRs are to be scanned, be the LSR that has just been added to the CLOSED_SET. Hence, an initial R would be the source LSR 110-1. For each N, with N being a LSR that is adjacent to R, do the following. For example, in a first iteration through the following, N might be the second LSR 110-2; in a second iteration, N might be the sixth LSR 110-6; and in a third iteration, N might be the seventh LSR 110-7. As noted above, the three LSRs are adjacent to the source LSR 110-1.

At step 2.1, if N is already in the CLOSED_SET, ignore N and continue to next iteration.

At step 2.2, calculate a sum of g(R) plus a cost associated with a path from R to N. For example, in the first iteration, with R being the source LSR 110-1 and N being the second LSR 110-2, the sum would be zero plus cost A 150-1.

At step 2.3, if the sum is less than an existing value of g(N), update g(N) to be the sum. Otherwise, ignore N and continue to next iteration.

At step 2.4, verify all constraints. If a path to N would violate a constraint, discard N by setting g(N) back to its previous value prior to the update at step 2.3, and continue to next iteration.

At step 2.5, add N to the OPEN_SET.

At step 3, select a LSR in the OPEN_SET with a lowest g( ). Delete the LSR from the OPEN_SET and add the LSR to the CLOSED_SET.

At step 4, repeat steps 2 and 3 until the destination LSR 110-3 is reached or the OPEN_SET becomes empty.

It will be understood by those skilled in the art that in searching for a least-cost path from the source LSR 110-1 to the destination LSR 110-3, a set of least-cost paths to other destination LSRs in the CLOSED_SET is also found. Beneficially, at least a set of costs, with each cost being associated with a respective path in the set of least-cost paths, is stored as they provide valuable information about the communication network in some embodiments.

Advantageously, a modified A* algorithm might be used to take advantage of information from the set of costs in some embodiments. Namely, g(X) for each LSR X in the CLOSED_SET can be used as heuristic information. It will be appreciated by those skill in the art that in the modified A* algorithm, a new step 2.4.5 is inserted and step 3 is replaced in the modified Dijkstra's by using g(X) as heuristic information. It will also be appreciated by those skill in the art that the modified A* algorithm is applied to search for a least-cost path from another destination LSR back to the source LSR, rather than for a least-cost path from the source LSR to another destination LSR.

For example, to subsequently search for a least-cost path from the fifth LSR 110-5 back to the first LSR 110-1, with the fifth LSR 110-5 being a new source LSR and the first LSR 110-1 being a new destination LSR, the following modified A* algorithm might be used. Prior to running the algorithm, the following data structures are also initialized to be empty: OPEN_SET and CLOSED_SET. Likewise, a cost function ag(X), which is a cost associated with a least-cost path among paths that have been found from the new source LSR 110-5 to a destination LSR X thus far, is initialized to infinity for all LSRs. The cost function ag( ) is set to zero for the source LSR.

At step 1, add the new source LSR 110-5 to the CLOSED_SET.

At step 2, let R, which is the LSR whose paths to all its adjacent LSRs are to be scanned, be the LSR that has just been added to the CLOSED_SET. Hence, an initial R would be the new source LSR 110-5. For each N, with N being a LSR that is adjacent to R, do the following.

At step 2.1, if N is already in the CLOSED_SET, ignore N and continue to next iteration.

At step 2.2, calculate a sum of ag(R) plus a cost associated with a path from R to N. For example, in a first iteration, with R being the new source LSR 110-5 and N being the fourth LSR 110-4, the sum would be zero plus cost D 150-4.

At step 2.3, if the sum is less than an existing value of ag(N), update ag(N) to be the sum. Otherwise, ignore N and continue to next iteration.

At step 2.4, verify all constraints. If a path to N would violate a constraint, discard N by setting ag(N) back to its previous value prior to the update at step 2.3, and continue to next iteration.

At step 2.4.5, update a heuristic cost function f(N) to be ag(N) plus g(N). For example, suppose N is the third LSR 110-3, ag(N) might be cost D 150-4 plus cost C 150-3 (i.e., ag(N) might be a least-cost path from the new source LSR 110-5 to the third LSR 110-3), and g(N) would be cost A 150-1 plus cost B 150-2 (i.e., g(N) would be the least-cost path between the new destination or the previous source LSR 110-1 and the third LSR 110-3 determined from the modified Dijkstra's algorithm above). Hence, f(N) might be cost D 150-4 plus cost C 150-3, plus cost A 150-1 plus cost B 150-2. It is noted that if g(N) is unavailable, i.e., no heuristic information is available from an earlier search using the modified Dijkstra's algorithm, g(N) is zero and f(N) has a same value as ag(N).

At step 2.5, add N to the OPEN_SET.

At step 3, select a LSR in the OPEN_SET with a lowest f( ). Delete the LSR from the OPEN_SET and add the LSR to the CLOSED_SET. It is noted that because cost A 150-1 plus cost B 150-2 is in fact the actual least-cost between the new destination LSR 110-1 and the third LSR 110-3, it provides an excellent and possibly perfect heuristic information for searching a path from the new source LSR 110-5 back to the new destination (or the previous source) LSR 110-1 through the third LSR 110-3. Indeed, the third LSR 110-3 is likely to be selected at this step at a certain point while running this algorithm as an intermediate LSR.

At step 4, repeat steps 2 and 3 until the new destination LSR 110-1 is reached or the OPEN_SET becomes empty.

Figure 2:
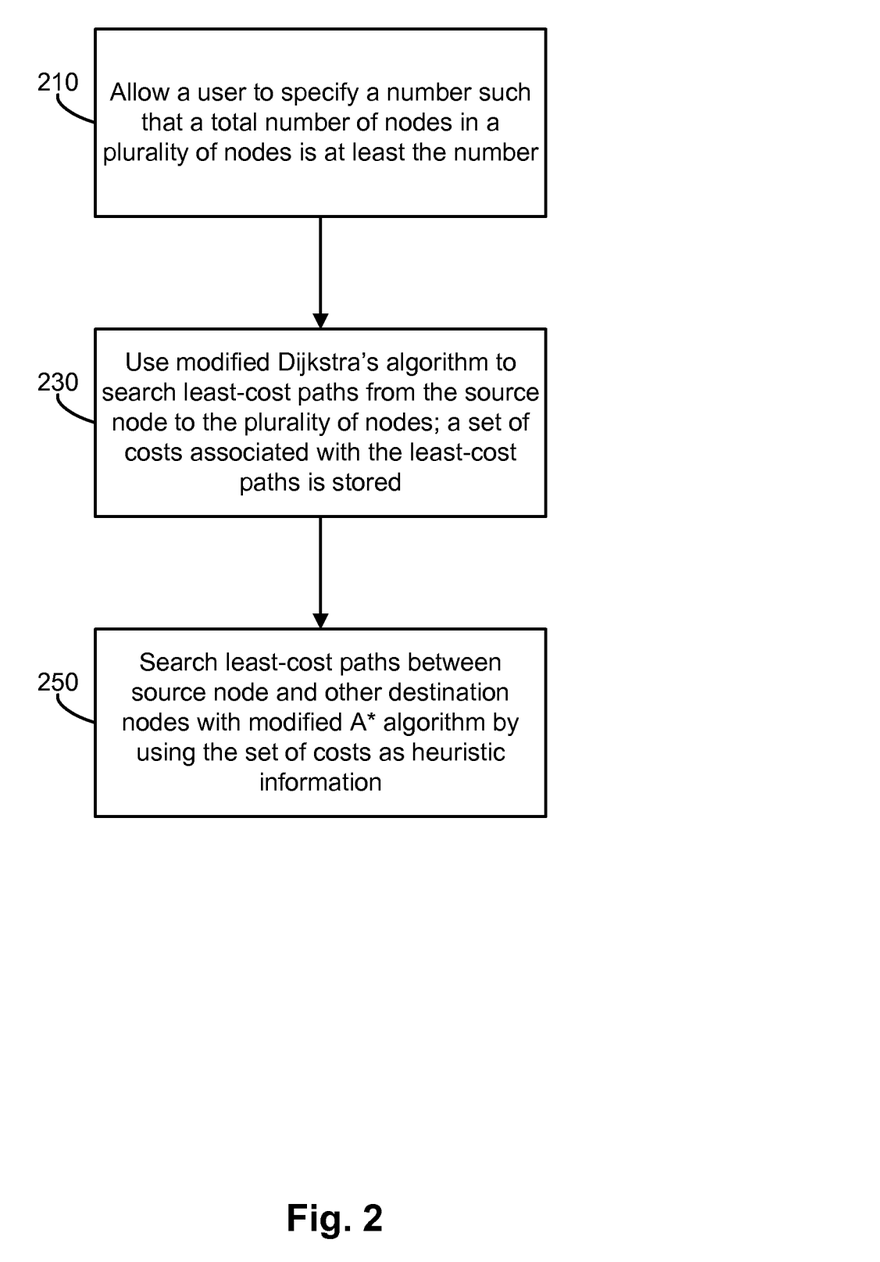
FIG. 2 provides a high level block diagram summarizing methods for searching a least-cost path between a source node and destination nodes in an embodiment of the invention.

FIG. 2 provides a high level block diagram summarizing methods for searching a least-cost path between a source node and destination nodes in an embodiment of the invention. At block 210, a user is allowed is to specify a first number such that a total number of nodes in a plurality of nodes is at least the first number; a plurality of least-cost paths from the source node to the plurality of nodes is to be searched with the modified Dijkstra's algorithm. Alternatively, the number might be specified as a percentage number of a total number of nodes. The user might also be allowed to specify a second number of destination nodes that are to be specifically searched for with the modified Dijkstra's algorithm (this second number is essentially the number of times that the modified Dijkstra's algorithm is to be run).

At block 230, the modified Dijkstra's algorithm is used to search least-cost paths from the source node to the plurality of nodes; a set of costs associated the least-cost paths is stored. As noted above, it will be understood by those skilled in the art that the plurality of nodes might include specific nodes to which least-cost paths have been specifically searched for, as well as nodes to which least-cost paths have been found while searching for the least-cost paths to the specific nodes. For example, in the above example, a least-cost path from the first LSR 110-1 to the third LSR 110-3 happens to be specifically searched for. It will be understood by those skilled in the art that a least-cost path from the first LSR 110-1 to the second LSR 110-2 might also be found while searching for the least-cost path from the first LSR 110-1 to the third LSR 110-3. Costs associated with the least-cost paths are stored. It is also noted that any of the third LSR 110-3 or the second LSR 110-2 might be considered as an intermediate node at block 250 below.

The method might continue to block 250 if a total number of nodes in the plurality of nodes is at least the first number specified by the user from block 210, and/or if a number of destination nodes that have been specifically searched for with the modified Dijkstra's algorithm is at least the second number specified by the user from block 210.

At block 250, least-cost paths between the source node and other destination nodes is then searched with the A* algorithm by using the set of costs as heuristic information. For example, subsequently, a least-cost path from the fifth LSR 110-5 back to the first LSR 110-1 is searched by using heuristic information obtained from searching for the least-cost path from the first LSR 110-1 to the third LSR 110-3. The third LSR 110-3 is likely to be selected as an intermediate node based on the heuristic information, and a least-cost path between the first LSR 110-1 and the fifth LSR 110-5 is thus calculated in this embodiment. Least-cost paths to other destination LSRs can likewise be calculated.

Figure 3:
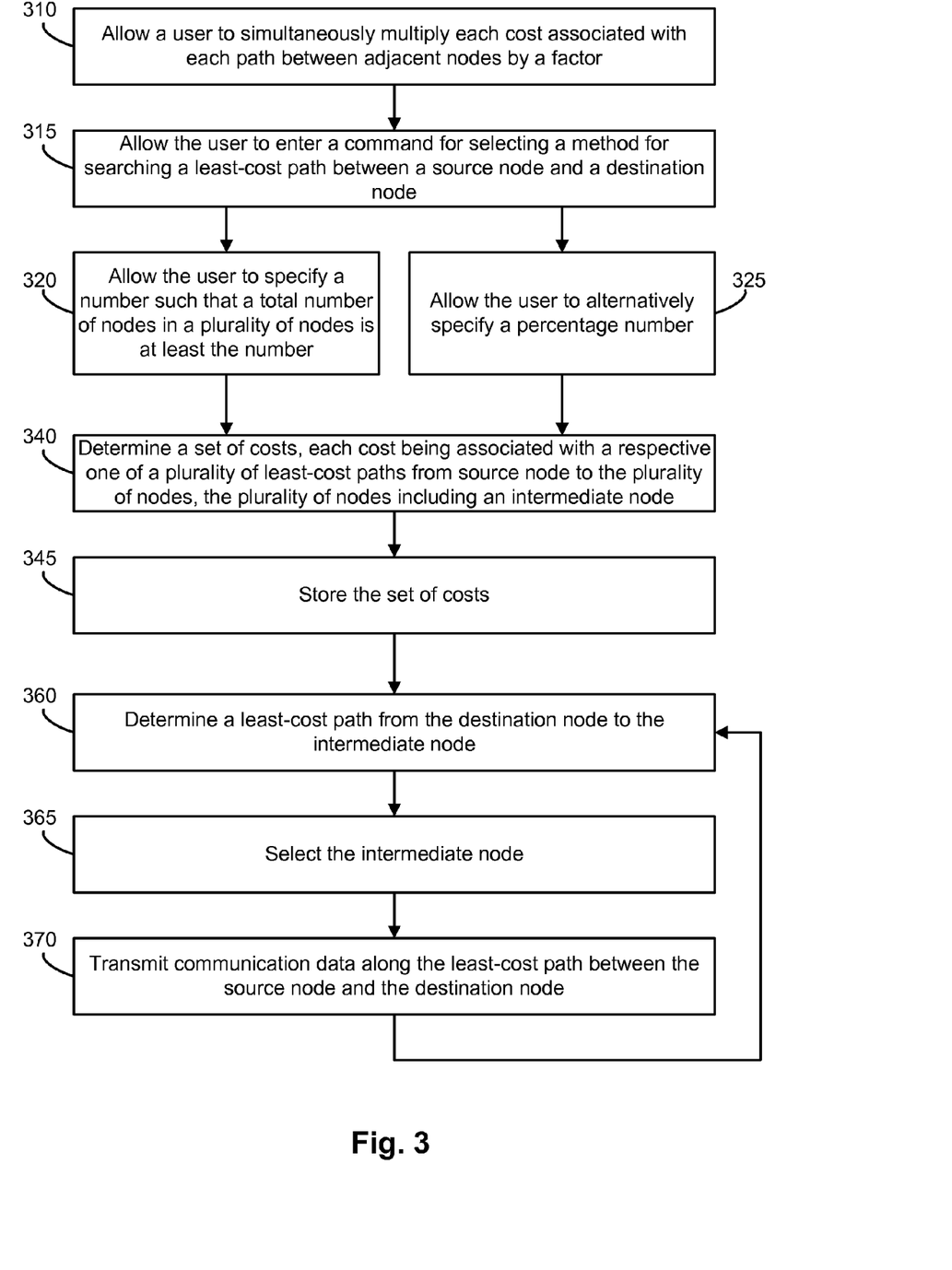
FIG. 3 is a flow diagram summarizing methods for searching a least-cost path between a source node and at least a destination node in an embodiment of the invention.

FIG. 3 is a flow diagram summarizing methods for searching a least-cost path between a source node and at least a destination node in an embodiment of the invention. As noted above, a cost is associated with a link. At block 310, a user might be allowed to simultaneously add, subtract, multiply, or divide each cost associated with each link between adjacent nodes by a factor. At block 315, the user might be allowed to enter a command for selecting a method for searching a least-cost path between a source node and a destination node.

The method might be a new and improved method in accordance with an embodiment of this disclosure. If the user does not enter the command, a default method might be selected automatically for the user.

At block 320, the user might be allowed to specify a number such that a total number of nodes in a plurality of nodes is at least the number. For each node in the plurality of nodes, a least-cost path among all possible paths from a source node to the each node is to be searched, for example, by using the modified Dijkstra's algorithm. The user might alternatively be allowed to specify a first percentage number such that a total number of nodes in the plurality of nodes as a second percentage number of a total number of nodes is at least the first percentage number.

For example, if the user has specified zero at block 320, then the modified Dijkstra's algorithm might not be used. Rather, the modified A* algorithm might be used even in an initial search between a source node and a first destination node. If the user has specified 30 at block 320, then the modified Dijkstra's algorithm is likely to be used in an initial search from a source node to a first destination node. If, as a result of the initial search, least-cost paths from the source node to nineteen nodes other than the first destination node have been found, then the modified Dijkstra's algorithm is likely to still be used in a second search from the source node to a second destination node. If, as a result of the second search, least-cost paths from the source node to nine nodes other than the second destination node have been found, then the modified A* algorithm is likely to be used in a third search from the source node to a third destination node. This is because by the time the third search is run, the first destination node, nineteen nodes, the second destination node, and nine nodes is at least 30 nodes. Alternatively, if there are a total of 150 nodes and the user has specified 20%, a similar result would be achieved.

At block 325, the user might be allowed to specify a number of destination nodes that are to be specifically searched for with the modified Dijkstra's algorithm. This number is expected to essentially be the number of times that the modified Dijkstra's algorithm is to be run. As noted above, it will be understood by those skilled in the art that the plurality of nodes might include specific nodes to which least-cost paths have been specifically searched for, as well as nodes to which least-cost paths have been found while searching for the least-cost paths to the specific nodes. This number is the number of the specific nodes.

At block 340, a set of costs, with each cost being associated with a respective one of a plurality of least-cost paths from the source node to the plurality of nodes in a communication network, might be determined. The plurality of nodes might include an intermediate node. The intermediate node is associated with an intermediate least-cost path in the plurality of least-cost paths. For example, the intermediate node might be the third LSR 110-3 above. As can be observed from the above modified Dijkstra's algorithm, each least-cost path in the plurality of least-cost paths corresponds to a respective one of the plurality of nodes. Each least-cost path in the plurality of least-cost paths comprises a path from the source node to the respective one of the plurality of nodes. The path is associated with a cost, and the cost is a lowest cost among costs associated with each path from the source node to the respective one of the plurality of nodes. In some embodiments, it might be possible to use Dijkstra's algorithm without constraint in determining a set of costs associated with least-cost paths to all nodes.

At block 345, the set of costs might be stored. Volatile memory, non-volatile memory, and/or other storage devices might be used to store this information. In some embodiments, this information might also be transferred and stored at a device or location other than the device and location where the information is initially obtained. For example, the information might be replicated and/or duplicated into another LSR or another apparatus. The information might also be collected and stored at a more central administrative station. Conversely, the set of costs, once stored, might also be cleared and/or refreshed.

At block 360, a least-cost path from the destination node to the intermediate node might be determined, for example, by using the modified A* algorithm above. For example, in the example above, the least-cost path from the fifth LSR 110-5 to the third LSR 110-3, with the third LSR 110-3 being the intermediate LSR, is determined; the cost associated with the least-cost path is cost D 150-4 plus cost C 150-3.

At block 365, the intermediate node might be selected. For example, in the example above, the third LSR 110-3 might be selected at least considering cost A 150-1 plus cost B 150-2 is in fact the actual least-cost between the first LSR 110-1 and the third LSR 110-3. It is noted that cost A 150-1 plus cost B 150-2 provides an excellent and possibly perfect heuristic information for searching a path from the fifth LSR 110-5 to the first LSR 110-1 through the third LSR 110-3. It is also noted that block 365 might be repeated multiple times as multiple intermediate nodes are considered. Accordingly, the least-cost path between the source node and the destination node might then be calculated. At block 370, communication data might be transmitted along the least-cost path between the source node and the destination node. In some embodiments, a representation of the least-cost path might be displayed for the user.

As alluded to earlier, it will be understood by those skilled in the art that the modified A* algorithm might be run for any number of additional destination nodes. For example, if least-cost paths to J destination nodes are first found with the modified Dijkstra's algorithm, and there are a total of K destination nodes for the source node, the modified A* algorithm might be repeated (e.g., by returning to block 360) in order to search for least-cost paths to the remaining K minus J destination nodes. By returning to and repeating from block 360, the remaining destination nodes might be determined without re-determining the set of costs. It is also noted that while J is generally less than K, J might be the same as K. If J is the same as K, the modified Dijkstra's algorithm is used to search for all least-cost paths between the source node and all destination nodes. Conversely, if J is zero, the modified A* algorithm might still be used without being aided by heuristic information.

Additionally, the algorithms might also be applied in a reverse direction. For example, the modified Dijkstra's algorithm might be used to search for a plurality of least-cost paths by treating a destination node (e.g., the fifth LSR 110-5) as a source LSR in the algorithm. The modified A* algorithm might then be used to search for a least-cost path from the first LSR 110-1 to the fifth LSR 110-5. Accordingly, a least-cost path between the source node (e.g., the first LSR 110-1) and the destination node (e.g., the fifth LSR 110-5) can also be determined. Indeed, the modified Dijkstra's algorithm and the modified A* algorithm might be used to search in reverse directions, but neither algorithm is restricted to search in a particular direction.

Furthermore, in searching for a least-cost path from a source node to a destination node, it might be possible that the destination node is in fact a same node as the intermediate node, and the least-cost path from the destination node to the intermediate node would be a path to the destination node itself. It might also be possible that an intermediate node is in a least-cost path between a source node and a first destination node, as well as in a least-cost path between the source node and a second destination node.

Moreover, a Path Computation Element ("PCE") might comprise an apparatus and/or instructions on a computer readable medium in accordance with the embodiments described above. A PCE is generally defined as an entity (component, application, or network node) that is capable of computing a network path or route based on a network graph and applying computational constraints.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of determining an end-to-end least cost path from a first edge label switch router ("LSR") to a second edge LSR in a multi-protocol label switching ("MPLS") network having a plurality of nodes between the first edge LSR and the second edge LSR, the method comprising:
   using Dijkstra's algorithm at least in part to search for a first least cost path from the first edge LSR to each respective node of the plurality of nodes, thereby determining a set of first least cost paths;
   storing a set of first costs, wherein each of the first costs corresponds to a respective one of the first least cost paths;
   using an A* algorithm at least in part to select the end-to-end least cost path by:
      initializing the second edge LSR as a next node of the end-to-end least cost path;
      selecting an adjacent node of the next node as a new node of the end-to-end least cost path, in accordance with a second cost of a second least cost path from the second edge LSR to the new node, and in accordance with the first cost of the first least cost path from the first edge LSR to the new node;
      setting the new node as the next node; and
      repeating the selecting and the setting until the first edge LSR is reached; and
   transmitting communication data between the first and second edge LSRs via the end-to-end least cost path.

2. The method of claim 1, wherein the end-to-end least cost path is an MPLS traffic engineering (TE) path.

3. The method of claim 1, wherein:
   a first directional metric is associated with a first link from a first node to a second node;
   a second directional metric is associated with a second link from the second node to the first node;
   the first node is adjacent to the second node in the MPLS network;
   the first directional metric is used as a first cost associated with the first link; and
   the second directional metric is used as a second cost associated with the second link.

4. The method of claim 1, wherein:
   a first directional metric associated with a first link from a first node to a second node is different from a second directional metric associated with a second link from the second node to the first node;
   the first node is adjacent to the second node in the MPLS network;
   the first directional metric is used as a first cost associated with the first link; and
   the first directional metric also is used as a second cost associated with the second link.

5. The method of claim 1, further comprising receiving input from a user to simultaneously multiply each cost associated with each link between adjacent nodes in the MPLS network by a factor.

6. The method of claim 1, wherein the Dijkstra's algorithm is used without constraint, and wherein the plurality of nodes comprises all nodes between the first edge LSR and the second edge LSR in the MPLS network.

7. The method of claim 1, further comprising receiving from a user a number such that a total number of nodes in the plurality of nodes is at least the number.

8. The method of claim 1, wherein the end-to-end least cost path from the first edge LSR to the second edge LSR satisfies at least one constraint.

9. The method of claim 1, further comprising repeating the using the A* algorithm for a plurality of second edge LSRs in the MPLS network without reusing the Dijkstra's algorithm and without re-storing the set of first costs.

10. The method of claim 1, further comprising receiving from a user a first percentage number, wherein a percentage of a first total number of nodes in the plurality of nodes is at least the first percentage number when compared with a second total number of nodes in the MPLS network.

11. A non-transitory computer readable storage medium having a computer-readable program embodied therein for directing operation of an apparatus including a controller, wherein the computer-readable program includes instructions for operating the apparatus for determining an end-to-end least cost path from a first edge label switch router ("LSR") to a second edge LSR in a multi-protocol label switching ("MPLS") network having a plurality of nodes between the first edge LSR and the second edge LSR in accordance with the following:
   using Dijkstra's algorithm at least in part to search for a first least cost path from the first edge LSR to each respective node of the plurality of nodes, thereby determining a set of first least cost paths;
   storing a set of first costs, wherein each of the first costs corresponds to a respective one of the first least cost paths;
   using an A* algorithm at least in part to select the end-to-end least cost path by:
      initializing the second edge LSR as a next node of the end-to-end least cost path;
      selecting an adjacent node of the next node as a new node of the end-to-end least cost path, in accordance with a second cost of a second least cost path from the second edge LSR to the new node, and in accordance with the first cost of the first least cost path from the first edge LSR to the new node;
      setting the new node as the next node; and
      repeating the selecting and the setting until the first edge LSR is reached.

12. The non-transitory computer readable storage medium of claim 11, wherein the end-to-end least cost path is an MPLS traffic engineering (TE) path.

13. The non-transitory computer readable storage medium of claim 11, wherein:
   a first directional metric is associated with a first link from a first node to a second node;
   a second directional metric is associated with a second link from the second node to the first node;

the first node is adjacent to the second node in the MPLS network;
the first directional metric is used as a first cost associated with the first link; and
the second directional metric is used as a second cost associated with the second link.

14. The non-transitory computer readable storage medium of claim 11, wherein:
a first directional metric associated with a first link from a first node to a second node is different from a second directional metric associated with a second link from the second node to the first node;
the first node is adjacent to the second node in the MPLS network;
the first directional metric is used as a first cost associated with the first link; and
the first directional metric also is used as a second cost associated with the second link.

15. The non-transitory computer readable storage medium of claim 11, wherein the computer-readable program further includes instructions for operating the apparatus in accordance with the following:
receiving input from a user to simultaneously multiply each cost associated with each link between adjacent nodes in the MPLS network by a factor.

16. The non-transitory computer readable storage medium of claim 11, wherein the Dijkstra's algorithm is used without constraint, and wherein the plurality of nodes comprises all nodes between the first edge LSR and the second edge LSR in the MPLS network.

17. The non-transitory computer readable storage medium of claim 11, wherein the computer-readable program further includes instructions for operating the apparatus in accordance with the following:
receiving from a user a number such that a total number of nodes in the plurality of nodes is at least the number.

18. The non-transitory computer readable storage medium of claim 11, wherein the end-to-end least cost path from the first edge LSR to the second edge LSR satisfies at least one constraint.

19. The non-transitory computer readable storage medium of claim 11, wherein the computer-readable program further includes instructions for operating the apparatus in accordance with the following:
repeating the using the A* algorithm for a plurality of second edge LSRs in the MPLS network without reusing the Dijkstra's algorithm and without re-storing the set of first costs.

20. The non-transitory computer readable storage medium of claim 11, wherein the computer-readable program further includes instructions for operating the apparatus in accordance with the following:
receiving from a user a first percentage number, wherein a percentage of a first total number of nodes in the plurality of nodes is at least the first percentage number when compared with a second total number of nodes in the MPLS network.

21. An apparatus for determining an end-to-end least cost path from a first edge label switch router ("LSR") to a second edge LSR in a multi-protocol label switching ("MPLS") network having a plurality of nodes between the first edge LSR and the second edge LSR, the apparatus comprising:
a communication interface;
a non-transitory computer readable storage medium;
a controller; and
a set of instructions executable by the controller, the set of instructions comprising:
instructions for using Dijkstra's algorithm at least in part to search for a first least cost path from the first edge LSR to each respective node of the plurality of nodes, thereby determining a set of first least cost paths;
instructions for storing a set of first costs, wherein each of the first costs corresponds to a respective one of the first least cost paths;
instructions for using an A* algorithm at least in part to select the end-to-end least cost path by:
initializing the second edge LSR as a next node of the end-to-end least cost path;
selecting an adjacent node of the next node as a new node of the end-to- end least cost path, in accordance with a second cost of a second least cost path from the second edge LSR to the new node, and in accordance with the first cost of the first least cost path from the first edge LSR to the new node;
setting the new node as the next node; and
repeating the selecting and the setting until the first edge LSR is reached.

22. The apparatus of claim 21, wherein the end-to-end least cost path is an MPLS traffic engineering (TE) path.

23. The apparatus of claim 21, wherein:
a first directional metric is associated with a first link from a first node to a second node;
a second directional metric is associated with a second link from the second node to the first node;
the first node is adjacent to the second node in the MPLS network;
the first directional metric is used as a first cost associated with the first link; and
the second directional metric is used as a second cost associated with the second link.

24. The apparatus of claim 21, wherein:
a first directional metric associated with a first link from a first node to a second node is different from a second directional metric associated with a second link from the second node to the first node;
the first node is adjacent to the second node in the MPLS network;
the first directional metric is used as a first cost associated with the first link; and
the first directional metric also is used as a second cost associated with the second link.

25. The apparatus of claim 21, the set of instructions further comprising receiving input from a user to simultaneously multiply each cost associated with each link between adjacent nodes in the MPLS network by a factor.

26. The apparatus of claim 21, wherein the Dijkstra's algorithm is used without constraint, and wherein the plurality of nodes comprises all nodes between the first edge LSR and the second edge LSR in the MPLS network.

27. The apparatus of claim 21, the set of instructions further comprising receiving from a user a number such that a total number of nodes in the plurality of nodes is at least the number.

28. The apparatus of claim 21, wherein the end-to-end least cost path from the first edge LSR to the second edge LSR satisfies at least one constraint.

29. The apparatus of claim 21, the set of instructions further comprising repeating the using the A* algorithm for a plurality of second edge LSRs in the MPLS network without reusing the Dijkstra's algorithm and without re-storing the set of first costs.

30. The apparatus of claim 21, the set of instructions further comprising receiving from a user a first percentage number, wherein a percentage of a first total number of nodes in the plurality of nodes is at least the first percentage number when compared with a second total number of nodes in the MPLS network.

31. The apparatus of claim 21, wherein a Path Computation Element ("PCE") comprises the apparatus.

* * * * *